(12) United States Patent
Mullenaux

(10) Patent No.: US 11,730,312 B2
(45) Date of Patent: Aug. 22, 2023

(54) WATER-DISPENSING SYSTEM WITH COFFEE MAKER

(71) Applicant: Aquaphant, Inc., Las Vegas, NV (US)

(72) Inventor: Thomas Mullenaux, San Pedro, CA (US)

(*) Notice: Subject to any disclaimer, the term of this patent is extended or adjusted under 35 U.S.C. 154(b) by 143 days.

(21) Appl. No.: 17/467,600

(22) Filed: Sep. 7, 2021

(65) Prior Publication Data

US 2022/0257047 A1 Aug. 18, 2022

Related U.S. Application Data

(63) Continuation-in-part of application No. 17/176,350, filed on Feb. 16, 2021, now Pat. No. 11,672,367.

(51) Int. Cl.
*A47J 31/46* (2006.01)
*E03B 3/28* (2006.01)
*A47J 31/60* (2006.01)
*B01D 53/26* (2006.01)

(52) U.S. Cl.
CPC .......... *A47J 31/468* (2018.08); *A47J 31/605* (2013.01); *B01D 53/265* (2013.01); *E03B 3/28* (2013.01)

(58) Field of Classification Search
CPC ........ A47J 31/46; A47J 31/465; B01D 53/265
See application file for complete search history.

(56) References Cited

U.S. PATENT DOCUMENTS

| | | | |
|---|---|---|---|
| 3,745,596 A | 7/1973 | Copeland | |
| 5,090,075 A | 2/1992 | Larson | |
| D342,393 S | 12/1993 | Discepolo | |
| 5,271,837 A | 12/1993 | Discepolo | |
| 6,182,453 B1* | 2/2001 | Forsberg | C02F 1/008 62/285 |
| 6,513,343 B2 | 2/2003 | Pahl | |
| 8,075,678 B1* | 12/2011 | Zerah | B01D 53/265 96/417 |
| 8,302,412 B2* | 11/2012 | Tieleman | C02F 3/1263 62/272 |
| 2009/0077992 A1* | 3/2009 | Anderson | C02F 1/041 62/291 |
| 2013/0337120 A1* | 12/2013 | Sabates, III | B01D 5/0006 99/279 |
| 2016/0231029 A1 | 8/2016 | Pan | |
| 2018/0369713 A1* | 12/2018 | Dorfman | B01D 5/006 |

* cited by examiner

*Primary Examiner* — Timothy L Maust
(74) *Attorney, Agent, or Firm* — Kyle A. Fletcher, Esq.

(57) ABSTRACT

The water-dispensing system with coffee maker comprises a water generation system, a condensate pump, a condensate filter, and a coffee maker. The coffee maker further comprises a water storage reservoir and a power circuit. The water generation system, the condensate pump, and the condensate filter are fluidically connected. The condensate filter fluidically connects to the water storage reservoir of the coffee maker. The water generation system and the condensate pump electrically connect to the power circuit. The water-dispensing system with coffee maker is powered using electrical energy provided by a power circuit provisioned through the coffee maker.

9 Claims, 4 Drawing Sheets

WATER-DISPENSING SYSTEM WITH COFFEE MAKER

CROSS REFERENCES TO RELATED APPLICATIONS

This non-provisional application claims priority under 35 USC 120 to U.S. non-provisional application Ser. No. 17/176,350 filed on Feb. 16, 2021 by the inventor: Thomas Mullenaux. This non-provisional application claims U.S. non-provisional application Ser. No. 17/176,350 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles including kitchen equipment. (A47J00/00)

SUMMARY OF INVENTION

The water-dispensing system with coffee maker comprises a water generation system, a condensate pump, a condensate filter, and a coffee maker. The coffee maker further comprises a water storage reservoir and a power circuit. The water generation system, the condensate pump, and the condensate filter are fluidically connected. The condensate filter fluidically connects to the water storage reservoir of the coffee maker. The water generation system and the condensate pump electrically connect to the power circuit. The water-dispensing system with coffee maker is powered using electrical energy provided by a power circuit provisioned through the coffee maker.

These together with additional objects, features and advantages of the water-dispensing system with coffee maker will be readily apparent to those of ordinary skill in the art upon reading the following detailed description of the presently preferred, but nonetheless illustrative, embodiments when taken in conjunction with the accompanying drawings.

In this respect, before explaining the current embodiments of the water-dispensing system with coffee maker in detail, it is to be understood that the water-dispensing system with coffee maker is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the water-dispensing system with coffee maker.

It is therefore important that the claims be regarded as including such equivalent construction insofar as they do not depart from the spirit and scope of the water-dispensing system with coffee maker. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
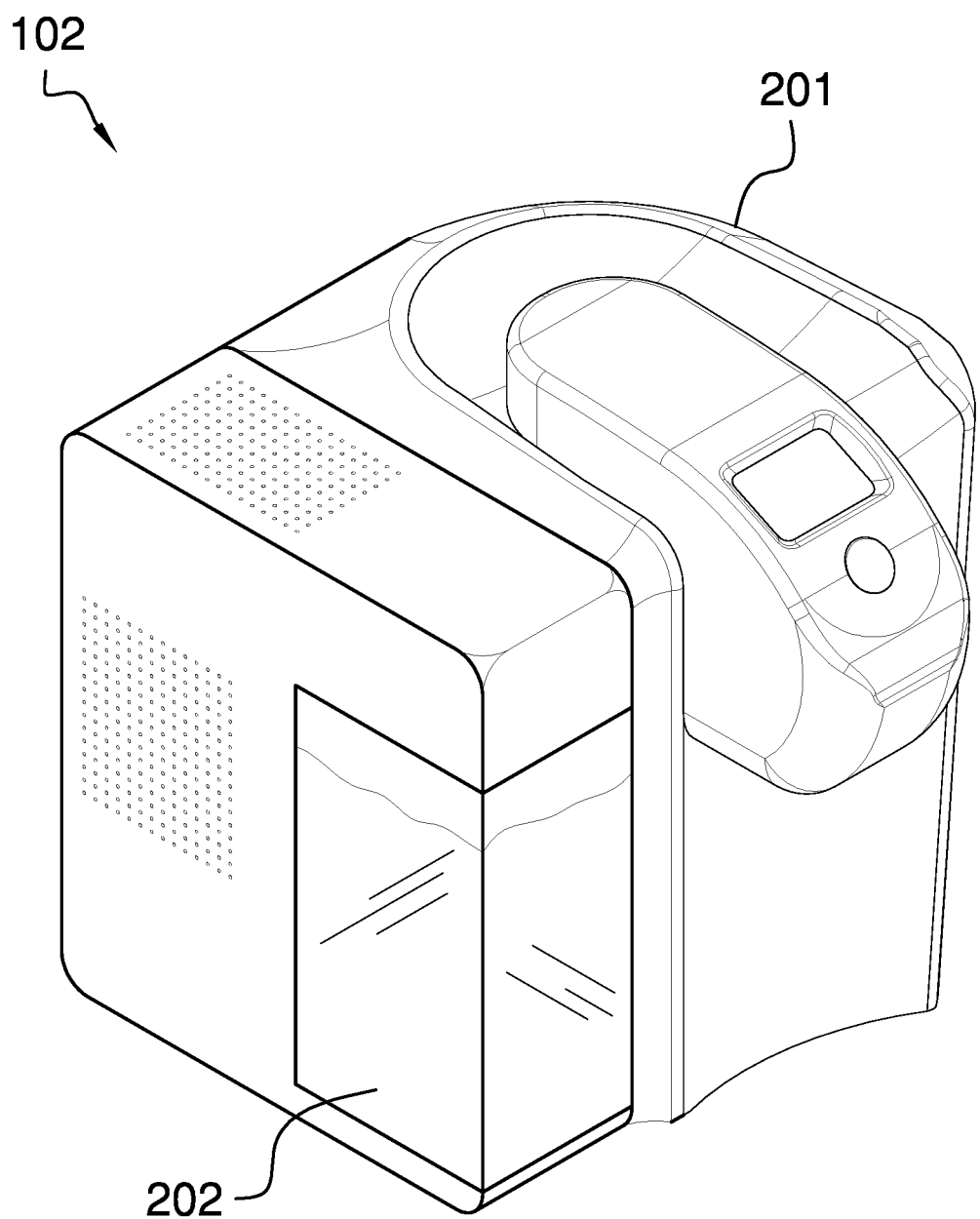
FIG. 1 is a perspective view of an embodiment of the disclosure.
Figure 2:
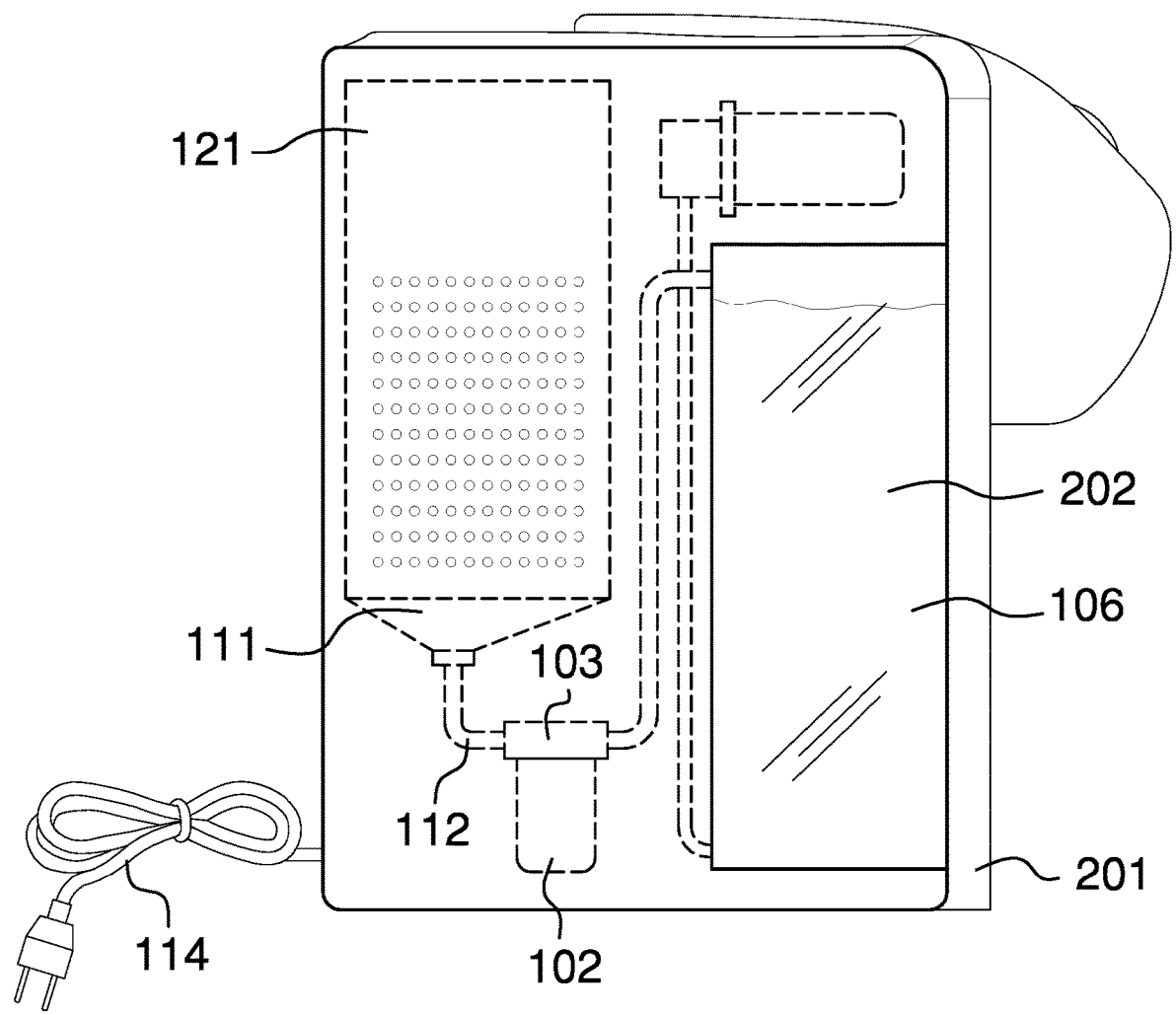
FIG. 2 is a side view of an embodiment of the disclosure.
Figure 3:
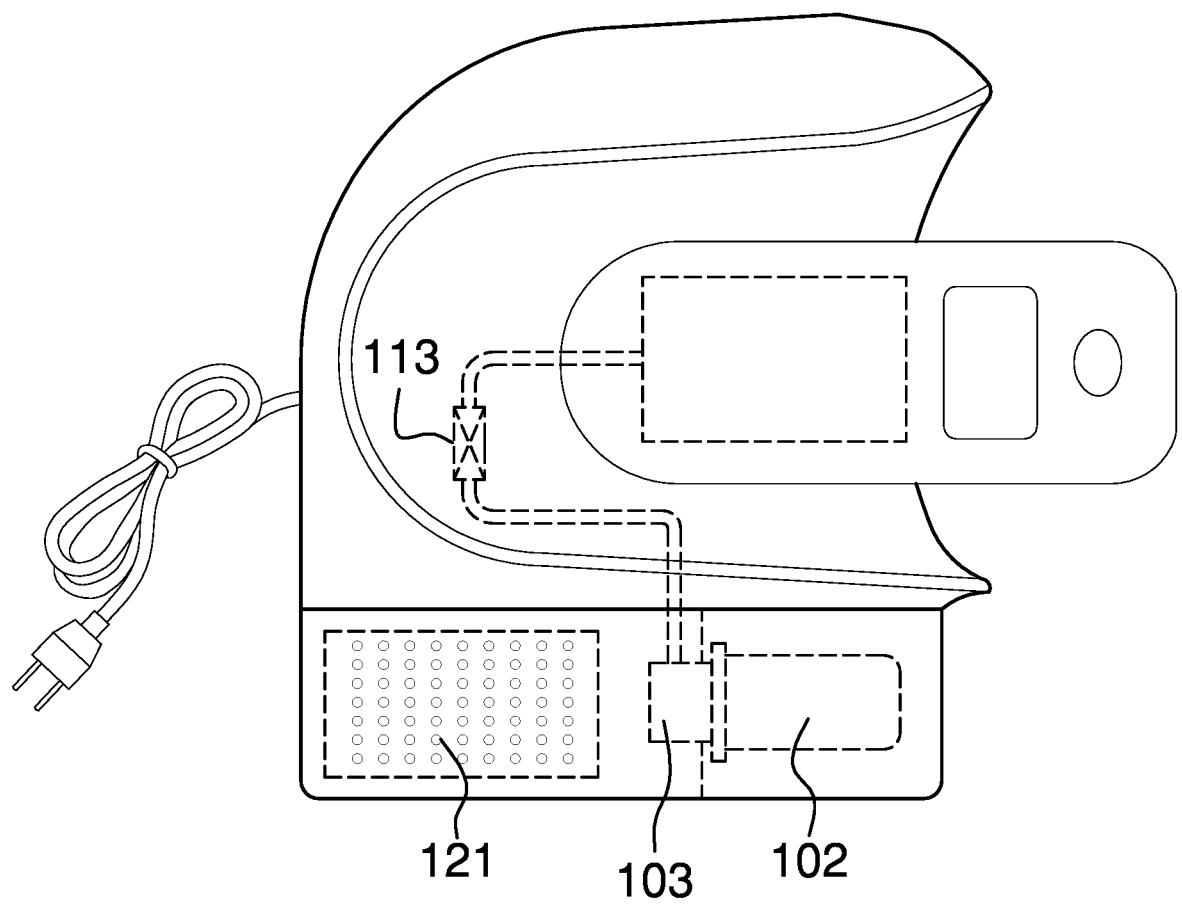
FIG. 3 is a top view of an embodiment of the disclosure.
Figure 4:
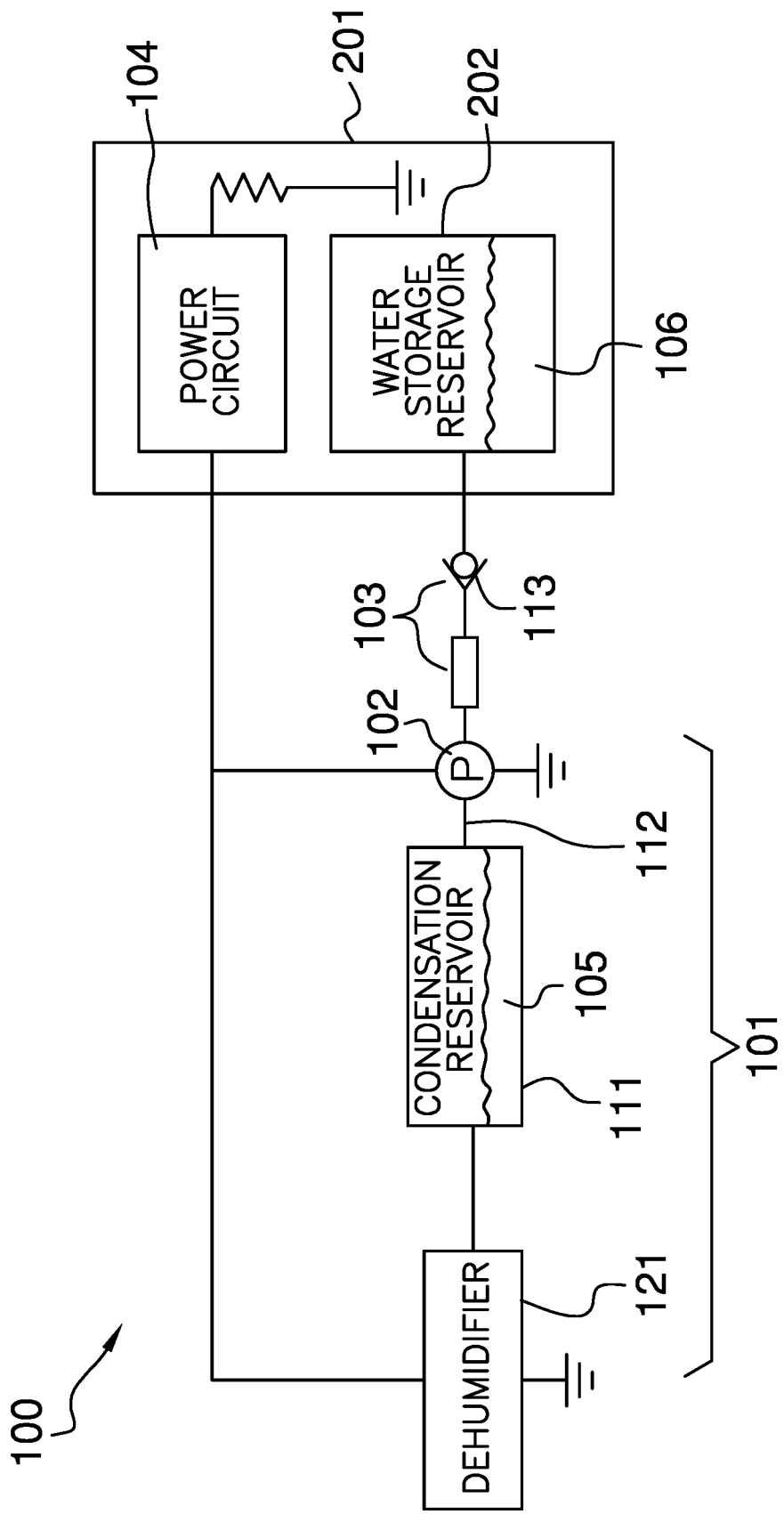
FIG. 4 is a schematic view of an embodiment of the disclosure.

Detailed reference will now be made to one or more potential embodiments of the disclosure, which are illustrated in FIGS. 1 through 4.

The water-dispensing system with coffee maker 100 (hereinafter invention) comprises a water generation system 101, a condensate pump 102, a condensate filter 103, and a coffee maker 201. The coffee maker 201 further comprises a water storage reservoir 202 and a power circuit 104. The water generation system 101, the condensate pump 102, and the condensate filter 103 are fluidically connected. The condensate filter 103 fluidically connects to the water storage reservoir 202 of the coffee maker 201. The water generation system 101 and the condensate pump 102 electrically connect to the power circuit 104. The invention 100 is powered using electrical energy provided by a power circuit 104 provisioned through the coffee maker 201. The water generation system 101 condenses water vapor drawn from the air into condensed water 105. The condensed water 105 is pumped by the condensate pump 102 through the condensate filter 103 into the water storage reservoir 202.

The coffee maker 201 is an appliance. The coffee maker 201 is a device that is dedicated to making coffee for subsequent consumption. The coffee maker 201 is an electrically powered device. The water storage reservoir 202 is the container that stores the drinking water 106 needed by the coffee maker 201 to make coffee. The water storage reservoir 202 forms a fluidic connection with the condensate filter 103. The water storage reservoir 202 receives drinking water 106 from the condensate filter 103. The power circuit 104 is an electric circuit. The power circuit 104 provides the electric energy necessary to operate both the coffee maker 201, the water generation system 101, and the condensate pump 102.

The condensate water 105 is a source of water generated by the water generation system 101. The condensate water 105 is generated through a phase change of water from a gas phase into a liquid phase. The water generation system 101 further comprises a dehumidifier 121 and a condensate reservoir 111. The dehumidifier 121 and the condensate reservoir 111 are fluidically connected.

The dehumidifier 121 is a device that changes the phase of water vapor in the atmosphere into the liquid phase condensate water 105. The dehumidifier 121 is an electrically operated device that draws electrical energy from the power circuit 104. The use of a dehumidifier 121 is well-known and documented in the mechanical arts.

The condensate reservoir 111 is a containment structure. The condensate reservoir 111 collects condensate water 105 from the dehumidifier 121. The condensate reservoir 111 stores the condensate water 105 until the condensate pump 102 pumps the condensate water 105 through the condensate filter 103 and into the water storage reservoir 202 of the coffee maker 201.

The condensate reservoir 111 further comprises a condensate discharge port 112. The condensate discharge port 112 is a fluidic connection formed between the condensate reservoir 111 and the condensate pump 102. The condensate pump 102 draws the condensate water 105 out of the condensate reservoir 111 through the condensate discharge port 112 for transport into the fluid input of the condensate filter 103.

The condensate pump 102 is a mechanical device. The condensate pump 102 is an electrically powered device. The condensate pump 102 generates a pressure differential. The pressure differential generated by the condensate pump 102 transports the condensate water 105 from the condensate reservoir 111 and through the condensate filter 103 into the water storage reservoir 202 of the coffee maker 201. The condensate reservoir 111 controls the operation of the condensate pump 102 by controlling the operation of an electric motor that drives the condensate pump 102. The use of a pump is well-known and documented in the mechanical arts.

The condensate filter 103 is a filtering device. The condensate filter 103 filters the condensate water 105 as it passes through the condensate filter 103. The condensate filter 103 converts the condensate water 105 into the drinking water 106 by removing impurities contained within the condensate filter 103. In the first potential embodiment of the disclosure, the condensate filter 103 is a bed filter that passes the condensate water 105 through a bed formed of activated carbon.

The condensate filter 103 further comprises a condensate check valve 113. The condensate check valve 113 forms a direct fluidic connection between the discharge port of the condensate filter 103 and the water storage reservoir 202 of the coffee maker 201. The condensate check valve 113 transports the drinking water 106 from the condensate filter 103 into the water storage reservoir 202. The condensate check valve 113 limits the direction of the flow of the drinking water 106 to the direction from the condensate filter 103 into the water storage reservoir 202 of the coffee maker 201.

The following definitions were used in this disclosure:

Appliance: As used in this disclosure, an appliance is a device or instrument intended to perform a single task.

Ball: As used in this disclosure, a ball refers to an object with a spherical or nearly spherical shape.

Ball Check Valve: As used in this disclosure, a ball check valve is a type of check valve. A ball check valve is a valve that has a ball inserted into it such that the ball move freely within the valve structure. The flow of fluid applies a force to the ball check valve that provides the motive forces that move the ball within the valve structure. The ball check valve is structured such that the flow of a fluid through the ball check valve in a first direction presses the ball into the flow path of the fluid through the ball check valve such that the fluid will apply a pressure against the ball that closes the fluid flow path through the ball check valve in the first direction. The ball check valve is further structured such that the flow of a fluid through the ball check valve in a second direction pushes the ball out of the flow path of the ball check valve such that the ball check valve allows the flow of fluid in the second direction. The second direction is the opposite direction to the first direction.

Check Valve: As used in this disclosure, a check valve is a valve that permits the flow of fluid in a single direction. Within selected potential embodiments of this disclosure, the check valve is a commercially available product that is selected from the group consisting of a ball check valve, a Tesla valve, and a duck valve.

Drinking Water: As used in this disclosure, drinking water is water that is deemed safe for drinking or use in cooking by humans. A synonym is potable water.

Duck Valve: As used in this disclosure, a duck valve is a check valve. The duck valve is formed from two or more elastomeric structures. When the two or more elastomeric structures are in their relaxed shape, the duck valve forms a seal. The seal is oriented such that a fluidic pressure differential in a first direction will separate the two or more elastomeric structures allowing the fluid to flow through the duck valve in the first directions. When the fluidic pressure differential is in a second direction that is opposite to the first direction, the fluidic pressure applies a pressure that maintains the two or more elastomeric structures in their relaxed shape and prevents the flow of fluid through the duck valve in the second direction. A duck valve derives its name from a commonly used shape of the two or more elastomeric structures. A duck valve is also called a silicone valve.

External Power Source: As used in this disclosure, an external power source is a source of the energy that is externally provided to enable the operation of the present disclosure. Examples of external power sources include, but are not limited to, electrical power sources and compressed air sources.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Gas: As used in this disclosure, a gas refers to a state (phase) of matter that is fluid and that fills the volume of the structure that contains it. Stated differently, the volume of a gas always equals the volume of its container.

Humidity: As used in this disclosure, humidity refers water vapor that is dissolved in the atmosphere. The mass of water dissolved into the atmosphere is limited by the temperature of the atmosphere.

Liquid: As used in this disclosure, a liquid refers to a state (phase) of matter that is fluid and that maintains, for a given pressure, a fixed volume that is independent of the volume of the container.

Phase: As used in this disclosure, phase refers to the state of the form of matter. The common states of matter are solid, liquid, gas, and plasma.

Phase Change Terminology: As used in this disclosure, the following terms are used to describe a phase change. A phase change from a solid phase to a liquid phase is called melting. A phase change from a liquid phase to a solid phase is called freezing or solidification. A phase change from a solid phase to a gas phase is called sublimation. A phase change from a gas phase to a solid phase is called deposition. A phase change from a liquid phase to a gas phase is called evaporation. A phase change from a gas phase to a liquid phase is called condensation. A phase change from a gas phase to a plasma phase is called ionization. A phase change from a plasma phase to a gas phase is called recombination.

Port: As used in this disclosure, a port is an opening formed in a first object that allows a second object to pass through a boundary formed by the first object.

Reservoir: As used in this disclosure, a reservoir refers to a container or containment system that is configured to store a liquid.

Solid: As used in this disclosure, a solid refers to a state (phase) of matter that: 1) has a fixed volume; and, 2) does not flow.

Tank: As used in this disclosure, a tank is an enclosed hollow structure used to store a fluid.

Tesla Valve: As used in this disclosure, a Tesla valve is a type of check valve that requires the use of no moving parts.

Valve: As used in this disclosure, a valve is a device that is used to control the flow of a fluid (gas or liquid) through a pipe, tube, or hose.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A water-dispensing system with coffee maker comprising
    a water generation system, a condensate pump, a condensate filter, and a coffee maker;
    wherein the water generation system, the condensate pump, and the condensate filter are fluidically connected;
    wherein the condensate filter and the coffee maker are fluidically connected;
    wherein the coffee maker further comprises a water storage reservoir and a power circuit;
    wherein the condensate reservoir further comprises a condensate discharge port;
    wherein the condensate discharge port is a fluidic connection formed between the condensate reservoir and the condensate pump;
    wherein the condensate pump draws the condensate water out of the condensate reservoir through the condensate discharge port for transport into the fluid input of the condensate filter;
    wherein the condensate filter further comprises a condensate check valve;
    wherein the condensate check valve forms a direct fluidic connection between the discharge port of the condensate filter and the water storage reservoir of the coffee maker;
    wherein the condensate check valve transports the drinking water from the condensate filter into the water storage reservoir;
    wherein the condensate check valve limits the direction of the flow of the drinking water to the direction from the condensate filter into the water storage reservoir of the coffee maker.

2. The water-dispensing system with coffee maker according to claim 1
    wherein the coffee maker is an appliance;
    wherein the coffee maker is an electrically powered device;
    wherein the water storage reservoir is the container that stores the drinking water needed by the coffee maker to make coffee;
    wherein the water storage reservoir forms a fluidic connection with the condensate filter;
    wherein the water storage reservoir receives drinking water from the condensate filter;
    wherein the power circuit is an electric circuit;
    wherein the power circuit provides the electric energy necessary to operate both the coffee maker, the water generation system, and the condensate pump.

3. The water-dispensing system with coffee maker according to claim 2
    wherein the water generation system condenses water vapor drawn from the air into condensed water;
    wherein the condensed water is pumped by the condensate pump through the condensate filter into the water storage reservoir.

4. The water-dispensing system with coffee maker according to claim 3
    wherein the condensate filter fluidically connects to the water storage reservoir of the coffee maker;
    wherein the water generation system and the condensate pump electrically connect to the power circuit.

5. The water-dispensing system with coffee maker according to claim 4
    wherein the water generation system further comprises a dehumidifier and a condensate reservoir;
    wherein the dehumidifier and the condensate reservoir are fluidically connected.

6. The water-dispensing system with coffee maker according to claim 5
    wherein the dehumidifier is a device that changes the phase of water vapor in the atmosphere into the liquid phase condensate water;
    wherein the dehumidifier is an electrically operated device that draws electrical energy from the power circuit.

7. The water-dispensing system with coffee maker according to claim 6
   wherein the condensate reservoir is a containment structure;
   wherein the condensate reservoir collects condensate water from the dehumidifier;
   wherein the condensate reservoir stores the condensate water until the condensate pump pumps the condensate water through the condensate filter and into the water storage reservoir of the coffee maker.

8. The water-dispensing system with coffee maker according to claim 7
   wherein the condensate pump is a mechanical device;
   wherein the condensate pump is an electrically powered device;
   wherein the condensate pump generates a pressure differential;
   wherein the pressure differential generated by the condensate pump transports the condensate water from the condensate reservoir and through the condensate filter into the water storage reservoir of the coffee maker;
   wherein the condensate reservoir controls the operation of the condensate pump by controlling the operation of an electric motor that drives the condensate pump.

9. The water-dispensing system with coffee maker according to claim 8
   wherein the condensate filter is a filtering device;
   wherein the condensate filter filters the condensate water as it passes through the condensate filter;
   wherein the condensate filter converts the condensate water into the drinking water by removing impurities contained within the condensate filter.

* * * * *